US010290238B1

(12) United States Patent
Mitchell et al.

(10) Patent No.: US 10,290,238 B1
(45) Date of Patent: May 14, 2019

(54) SIGN CLIP FOR CHAIN LINK FENCE

(71) Applicant: SmartSign LLC, Brooklyn, NY (US)

(72) Inventors: John Mitchell, Brooklyn, NY (US); Blair Brewster, Brooklyn, NY (US); Jeff Boser, Brooklyn, NY (US)

(73) Assignee: SmartSign LLC, Brooklyn, NY (US)

( * ) Notice: Subject to any disclaimer, the term of this patent is extended or adjusted under 35 U.S.C. 154(b) by 0 days.

(21) Appl. No.: 16/045,005

(22) Filed: Jul. 25, 2018

(51) Int. Cl.
*G09F 7/18* (2006.01)
*F16B 2/22* (2006.01)
*E04H 17/06* (2006.01)

(52) U.S. Cl.
CPC .................. *G09F 7/18* (2013.01); *F16B 2/22* (2013.01); *E04H 17/06* (2013.01); *G09F 2007/1856* (2013.01)

(58) Field of Classification Search
CPC .... G09F 7/18; G09F 2007/1856; E04H 17/06
See application file for complete search history.

(56) References Cited

U.S. PATENT DOCUMENTS

| | | | | |
|---|---|---|---|---|
| 3,572,640 A * | 3/1971 | Vecchiarelli | .......... | E04H 17/066 256/34 |
| 3,888,289 A * | 6/1975 | Reynolds | ................ | F16B 39/26 411/134 |
| 4,723,761 A * | 2/1988 | Cluff | ..................... | E04H 17/066 256/32 |
| 4,953,817 A | 9/1990 | Mosteller | | |
| 5,165,664 A * | 11/1992 | Cluff | ..................... | E04H 17/066 256/22 |
| 5,342,021 A * | 8/1994 | Watson | .................... | E04H 17/06 256/1 |
| 5,441,239 A * | 8/1995 | Watson | .................... | E04H 17/02 256/1 |
| 5,959,255 A * | 9/1999 | Langlie | ................ | H01B 17/145 174/161 F |
| 6,996,928 B1 * | 2/2006 | Lux | ....................... | E04H 17/066 256/1 |
| 7,076,898 B1 * | 7/2006 | Hunt | ........................ | G09F 7/02 256/32 |
| 8,523,127 B1 | 9/2013 | Bennett | | |
| 9,696,610 B2 | 7/2017 | Truesdale | | |
| 2003/0201376 A1 * | 10/2003 | Knight | ...................... | G09F 7/18 248/490 |
| 2003/0205654 A1 * | 11/2003 | Petak | ....................... | H02G 3/12 248/300 |

(Continued)

OTHER PUBLICATIONS

"My Parking Sign", https://web.archive.org/web/20160429135206/https://www.myparkingsign.com/MPS2/sign-clips-for-a-chain-link-fence/sku-fence-clip-02, Apr. 29, 2016 (Year: 2016).*

(Continued)

*Primary Examiner* — Gary C Hoge
(74) *Attorney, Agent, or Firm* — Dilworth & Barrese, LLP

(57) ABSTRACT

A sign clip for a chain link fence includes a planar surface having a front surface and a back surface, the planar surface defining therethrough at least two holes of different diameters, wherein the planar surface loops back over the front surface on a first end and forms a first channel extending from the front surface, and wherein the planar surface loops perpendicular to the planar surface on a second end and forms a second channel extending perpendicular from the back surface.

16 Claims, 7 Drawing Sheets

(56) References Cited

U.S. PATENT DOCUMENTS

| | | | | |
|---|---|---|---|---|
| 2005/0274937 A1 | * | 12/2005 | Moore | E04H 17/066 |
| | | | | 256/1 |
| 2006/0086878 A1 | * | 4/2006 | Cormier | G09F 7/18 |
| | | | | 248/314 |
| 2009/0134376 A1 | * | 5/2009 | Garceau | E04H 17/066 |
| | | | | 256/47 |
| 2010/0132236 A1 | * | 6/2010 | Dibben | G09F 7/18 |
| | | | | 40/606.01 |
| 2010/0282935 A1 | | 11/2010 | Zannoni | |
| 2013/0082155 A1 | * | 4/2013 | McCormack | A63B 69/0002 |
| | | | | 248/220.21 |
| 2017/0068147 A1 | * | 3/2017 | Truesdale | G03B 17/561 |
| 2018/0186312 A1 | * | 7/2018 | Martin | B60R 13/105 |

OTHER PUBLICATIONS

"Fence Sign Holder Bracket" Accuform Catalog p. 338.

* cited by examiner

SIGN CLIP FOR CHAIN LINK FENCE

BACKGROUND

The present disclosure relates to clips or mounting hardware for mounting signage to a chain link fence.

Signs are widely used in all aspects of society. Traffic signs, warning signs, event signs, are just some examples. Signs are mounted to a variety of surfaces, such as walls and fences.

Chain link fence, also known as cyclone fence, is a popular form of fencing. The fabric of a chain link fence has diamond-shaped cells formed by intertwining wires that make up the chain link fence, and the fabric of the chain length fence is typically held in place by fence posts and rails. Because a chain link fence is rugged and sturdy, there have been a variety of devices that persons have developed to hold signs to a chain link fence. It is generally desirable for such devices to be securely attached to a chain link fence during use.

Attaching signs to fencing in general, and to chain link fences in particular, is accomplished in many ways. Zip ties, nuts and bolts, and various fasteners have been utilized. Most of these methods are not secure and/or do not allow for varying sizes of signs and the holes thereof used to attach the sign to the fence. For example, small sign come with small holes and large signs come with large holes for attaching the sign to a fence. Clips with single sized holes require adapters and other mechanical components, e.g., a press insert or a bushing, to adapt small screws for a small sign to the clip.

In addition, many prior art designs have sharp cut corners that often get caught on persons or objects resulting in injury or damage.

Therefore, there is a need for a clip for attaching a plurality of different types of signs to a chain link fence without the need for elaborate connecting devices.

The present invention solves these and other problems in the prior art.

SUMMARY

A sign clip for chain link fence includes a single planar surface that includes two bends to enable attachment to chain link fence wires.

According to a first illustrative embodiment, a clip includes a central section having a front planar surface, a rear planar surface, a first end and a second end, the central section defining at least two holes of different sizes extending therethrough; a first connecting section connected to the first end and extending from the planar surface and looping back and over the front planar surface to form a first channel extending from the front planar surface; and a second connecting section connected to the second end and extending from and perpendicular to the rear planar surface and looping back to form a second channel perpendicular to the rear planar surface.

According to a second illustrative embodiment, a clip includes a planar surface having a front surface and a back surface, the planar surface defining therethrough at least two holes of different diameters, wherein the planar surface loops back over the front surface on a first end and forms a first channel extending from the front surface, and wherein the planar surface loops perpendicular to the planar surface on a second end and forms a second channel extending perpendicular from the back surface.

According to a third illustrative embodiment, a sign clip kit includes a clip includes a planar surface having a front surface and a back surface, the planar surface defining therethrough at least two holes of different diameters, wherein the planar surface loops back over the front surface on a first end and forms a first channel extending from the front surface, and wherein the planar surface loops perpendicular to the planar surface on a second end and forms a second channel extending perpendicular from the back surface, wherein the holes are threaded; a screw sized to mate with a smaller of the at least two holes; and a bolt sized to mate with a larger of the at least two holes.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
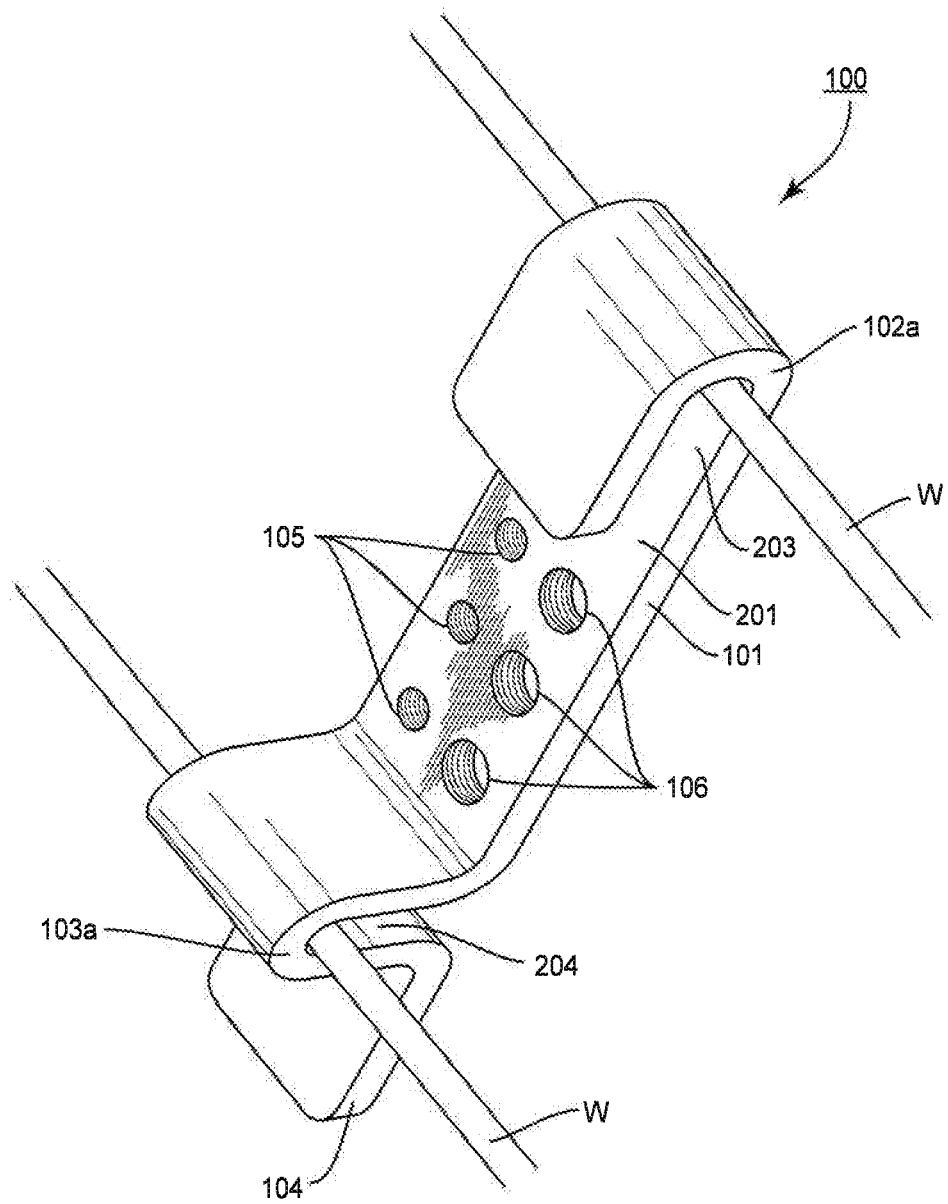
FIG. 1 is a perspective view of a representative sign clip attached to a chain link fence according to a first illustrative embodiment of the present disclosure.
Figure 2:
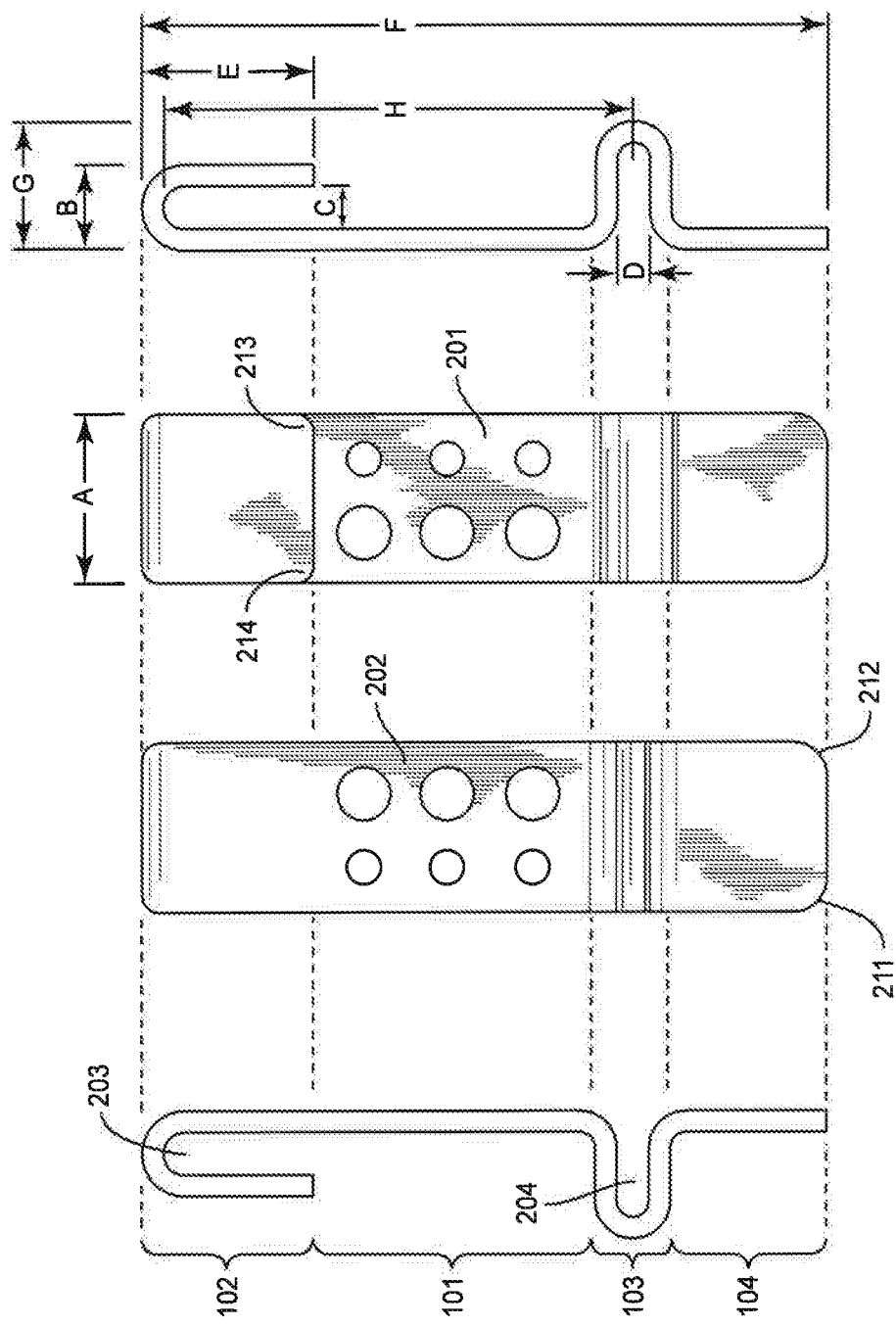
FIGS. 2A-2D are plan views of the representative sign clip according to a first illustrative embodiment of the present disclosure.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

A sign clip for a chain link fence is disclosed herein. Reference will now be made in detail to the illustrative embodiments of the present disclosure, which are illustrated in the accompanying figures.

As described above, a diamond cell of a chain link fence is defined by the four wires that define the perimeter of the diamond cell. The distances between the wires can vary depending on the design of the chain link fence. Typically, the distance between the wires is approximately 2 inches, but can be smaller, e.g., 1 inch, or larger, e.g., 4 inches. One skilled in the art will understand that the sign clip described herein can be altered in dimensions to fit the different sizes of chain link fences.

A sign clip 100 is a single planar surface that includes bends 102a/103a to enable attachment to chain link fence wires W.

The planar surface 101 defines at least 2 holes of different sizes to accommodate either fastener 301 or 302 (e.g., a bolt 301 or a screw 302). Although described as a bolt and a screw, the fasteners 301/302 can both be screws or bolts or other threaded fasteners. In the preferred embodiment, a plurality of holes 105 and holes 106 are provided to accommodate various sized signs, thus making the sign clips 100 more versatile than other single hole clips. In one embodiment, the bolt 301 is a 2⅜ inch bolt and the screw 302 is a 2³⁄₁₆ inch screw; the threaded holes are sized to mate with the bolt and screw.

The inclusion of the 2 different sized holes eliminates the use of a press insert or bushing. Press inserts often do not hold position and twist out of the holes when being inserted. The bushings are an unnecessary component that often get lost and require additional step when attaching the sign to the fence. The current sign clip design solves these problems and improves over the prior art.

In the embodiment that includes the plurality of holes of the 2 different sizes, the provision of multiple holes of 2 different sizes allows for easy positioning while lining up the sign when mounting.

The sign clip 100 is comprised of 3 segments, a planar surface 101, a first bended portion 102 connected at one end of the planar surface 101, and a second bended portion 103 connected at a second end of the planar surface 101. In addition, the sign clip 100 can include a tail piece 104 connected to an end of the second bended portion 103.

The planar surface 101 has a front surface 201 and a back surface 202. The planar surface 101 loops back over the front surface 201 at the first bended portion 102 to form a first channel 202 extending from the front surface 201. At the other end, the planar surface 101 loops perpendicular to the planar surface 101 at the second bended portion 103 to form a second channel 204 extending perpendicular from the back surface 202.

One advantage of the sign clip 100 over the prior art designs is the rounding of the corners 211-214. The absence of sharp corners prevents the sign clip 100 from getting caught on persons or objects, thus preventing injury or damage. The current sign clip design solves these problems and improves over the prior art.

In the preferred embodiment, sign clip 100 is made of heavy duty galvanized steel and measures 0.10" thick. Width A of the sign clip 100 is 1 inch. Depth B at the first bended portion 102 of the sign clip 100 is ½ inch. Length E of the first bended portion 102 is 1 inch. Depth G at the second bended portion 103 of the sign clip 100 is ¾ inch. Length F of the sign clip 100 is 4 inches. Widths C and D of the channels 203 and 204 are dimensioned to accommodate the wire W of the chain link fence, and are preferably ³⁄₁₆ inch.

In order to sign clip 100 to attach to two adjacent wires W of chain link fence, the distance from the inner end of the first channel 203 to the second channel 204 needs to be slightly greater than the distance between the adjacent wires W. In a preferred embodiment, distance H is 2¼ inches to accommodate a 2 inch distance between wires W.

As discussed herein, the dimensions of the sign clip can be adjusted to accommodate fencing of different sizes and types.

In operation, the sign clip 100 is easy to install and provides flexibility for many applications. First channel 203 is fitted onto fence wire W. A rotating motion of the sign clip 100 about the wire W inserted in the first channel 203 moves the second channel 204 into place over adjacent wire W. With the sign clip 100 in place on the fence, the sign 701 is positioned on the back 202 of the sign clip 100. A hole in the sign 701 (not shown) is aligned with one of the holes 105/106 in the sign clip 100. An appropriately sized fastener 301/302 is selected and inserted through the hole in the sign and mated with the aligned hole 105/106. Tightening the fastener 105/106 secured the sign 701 to the fence.

Figure 3:
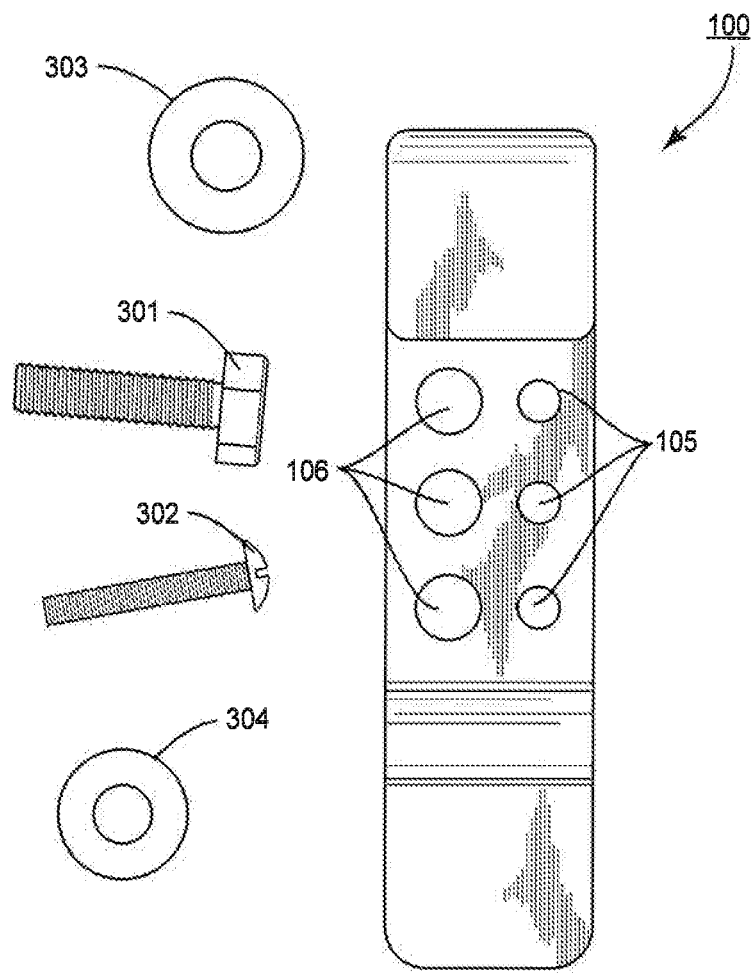
FIG. 3 is a front plan view of the representative sign clip with various mounting hardware according to a first illustrative embodiment of the present disclosure.
Figure 4:
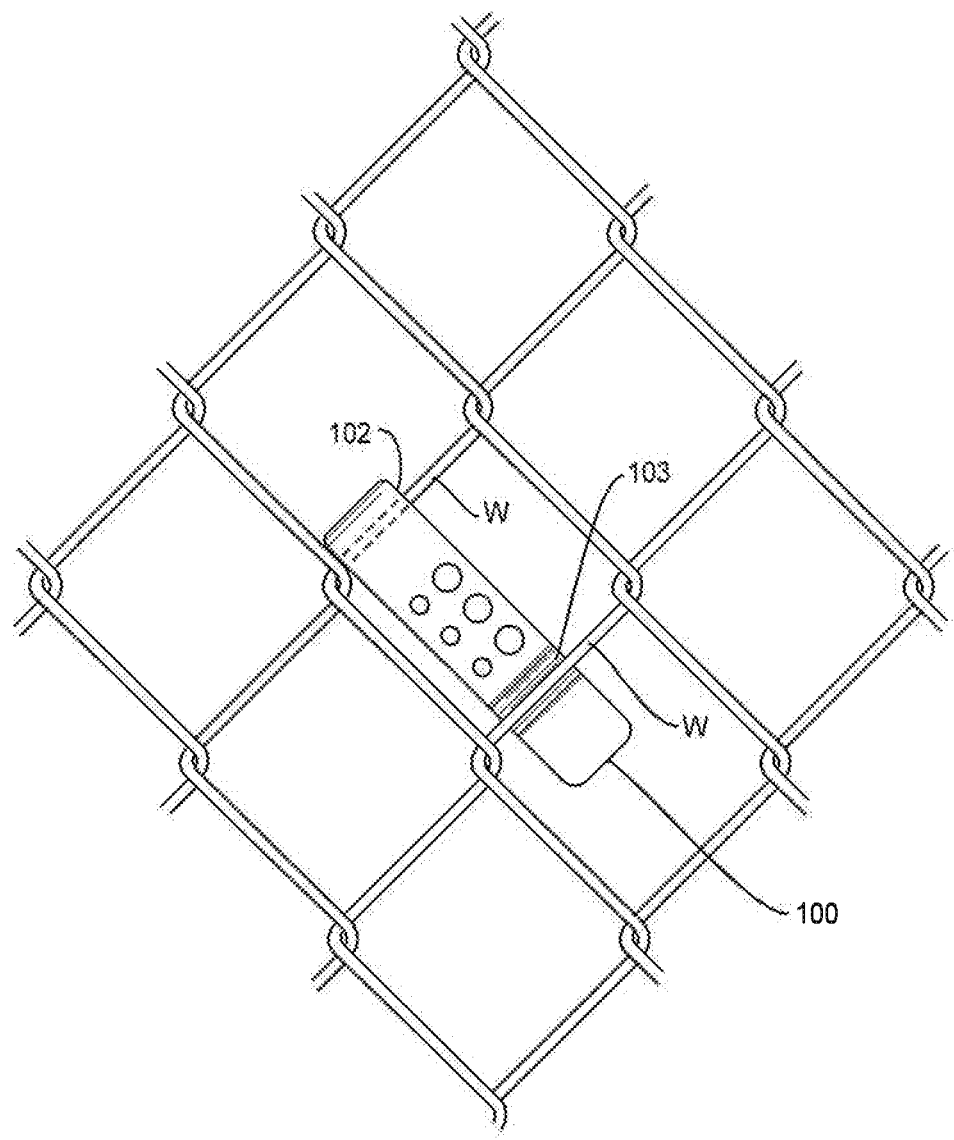
FIG. 4 is a rear view of the representative sign clip attached to a chain link fence according to a first illustrative embodiment of the present disclosure.
Figure 5:
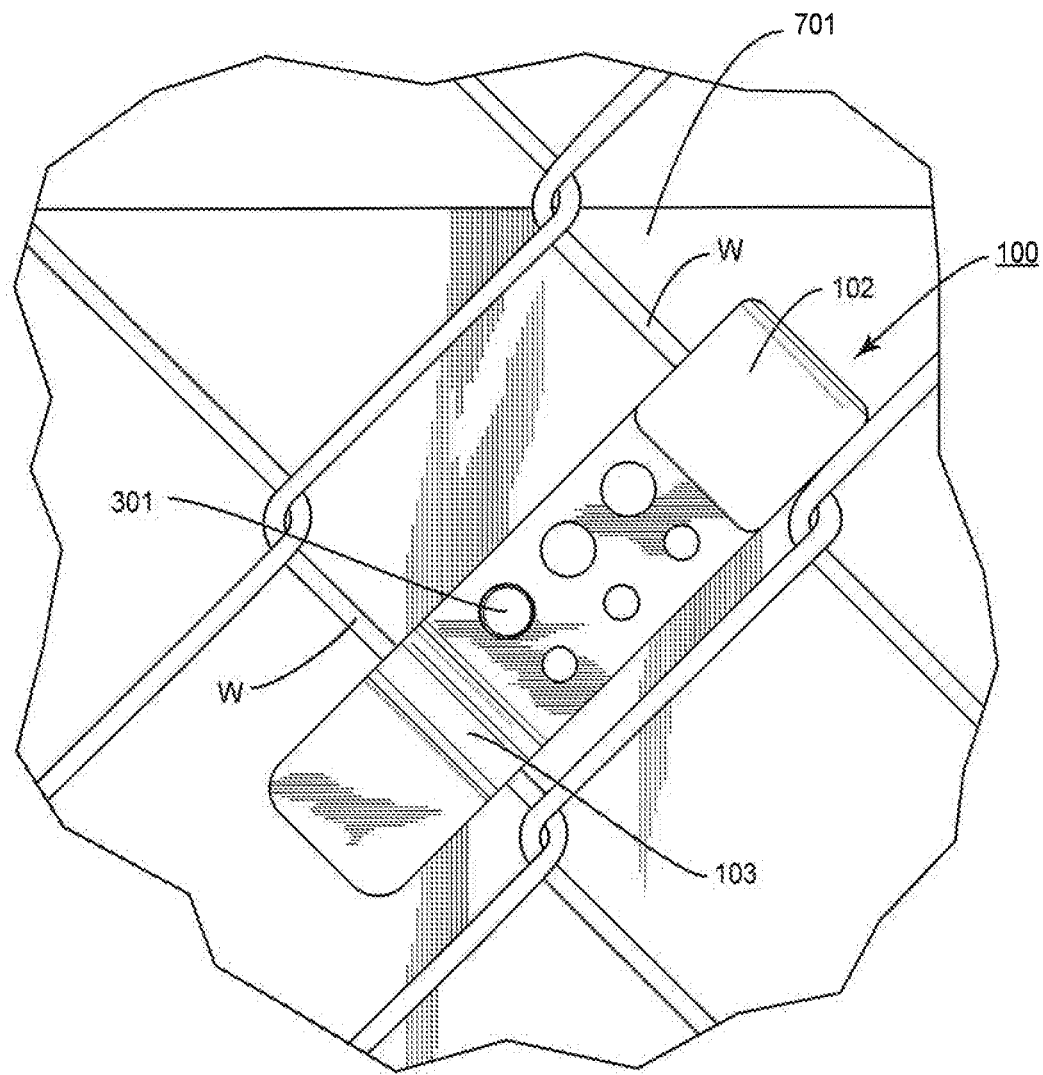
FIG. 5 is a front view of a representative sign clip attached to a chain link fence according to a first illustrative embodiment of the present disclosure.
Figure 6:
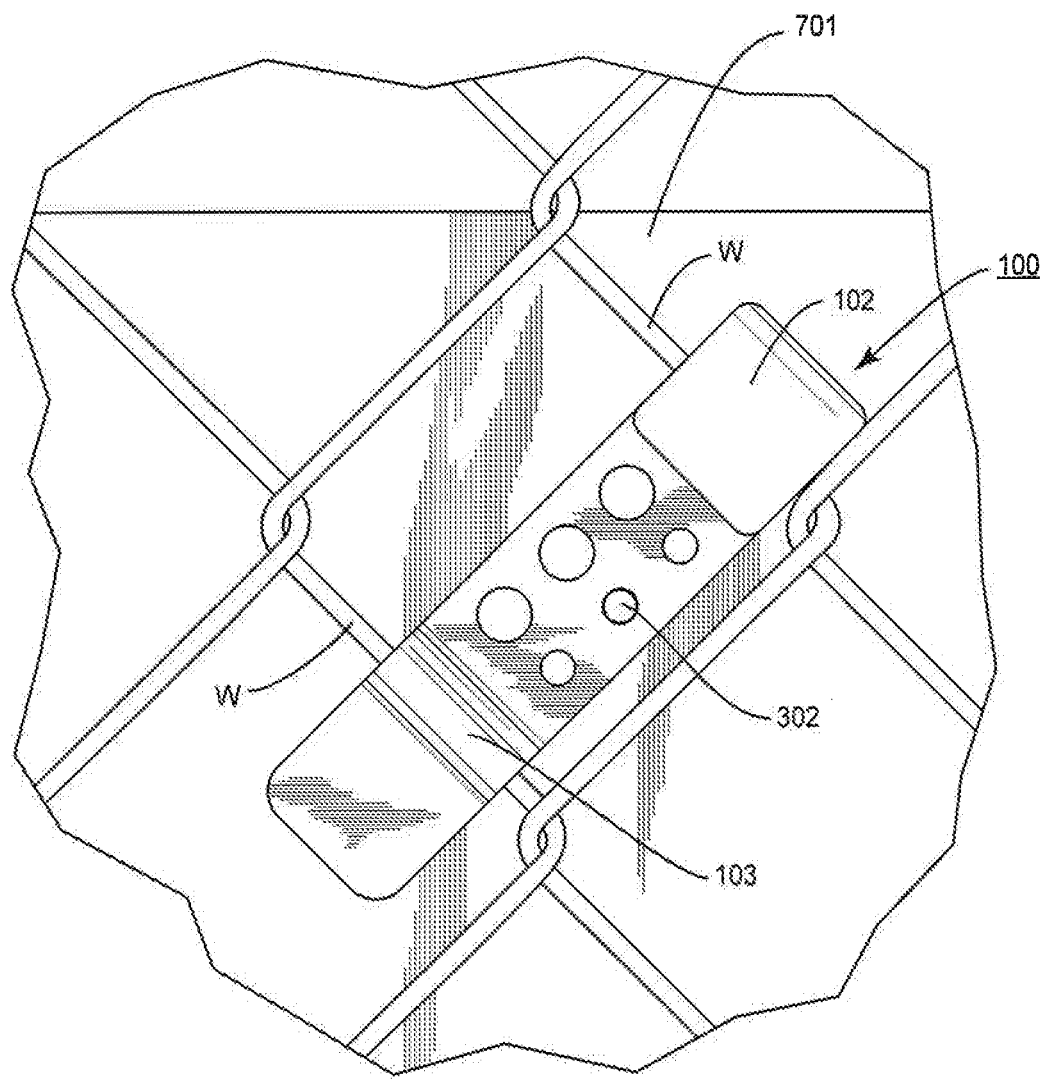
FIG. 6 is a front view of a representative sign clip attached to a chain link fence with a sign attached thereto according to a first illustrative embodiment of the present disclosure.
Figure 7:
FIG. 7 is a front view of a sign attached to a chain link fence according to a first illustrative embodiment of the present disclosure.

As shown in FIG. 3, the sign clip can be assembled as a kit to provide a user with all the components required to attach a sign to a chain link fence. A typical kit contains a sign clip 100, a large fastener 301 (e.g., a bolt), and a small fastener 302 (e.g., a screw). In addition, a kit can contain a large washer 303 for the large fastener 301 and a small washer 304 for the smaller fastener 302. In a preferred embodiment, the kit would contain 2 of each of the above components to secure 2 ends of the sign to the fence.

In addition, other fencing designs, e.g., common chicken wire, will lend themselves to use of the described sign clip that is altered to fit the particular adjacent wires. Still further, fencing having a lattices design can be accommodated by widening the loops to accommodate the size of the lattice slat. Other variations are contemplated.

The sign clip described herein can be manufactured from different metals, for example, copper, bronze, galvanized steel, stainless steel, cast white metal alloys; cast zinc, and/or cast aluminum. In addition, the sign clip can be made from non-metallic materials such as hardened plastics, epoxies, and fiber glass.

The present invention can achieve an excellent connection between a chain link fence and a sign, thus providing an improvement over the prior art.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A clip, comprising:
    a central section having a front planar surface, a rear planar surface, a first end and a second end, the central section defining an array of holes of different sizes extending therethrough;
    a first connecting section connected to the first end and extending from the front planar surface and looping back and over the front planar surface to form a first channel extending from the front planar surface; and a second connecting section connected to the second end and extending from and perpendicular to the rear planar surface and looping back to form a second channel perpendicular to the rear planar surface, wherein said array of holes comprises two parallel rows of holes extending between said first and second ends, and said holes in each row have the same diameter and said adjacent holes in said adjacent parallel rows have different diameters from one another.

2. The clip of claim 1, wherein the second connecting section extends past the second channel in the same plane as the central section.

3. The clip of claim 1, wherein corners of the clip are rounded.

4. The clip of claim 1, wherein the distance between the first channel and the second channel is defined by a distance between adjacent wires forming a cell of a chain link fence.

5. The clip of claim 1, wherein the holes are threaded.

6. The clip of claim 1, wherein in a direction of viewing said front planar surface with said first end on top and said second end on the bottom, said row on the left has holes of smaller diameter than said row on the right.

7. A clip, comprising:

a planar surface having a front surface and a back surface, the planar surface defining therethrough an array of holes of different diameters, wherein the planar surface loops back over the front surface on a first end and forms a first channel extending from the front surface, the planar surface loops perpendicular to the planar surface on a second end and forms a second channel extending perpendicular from the back surface, said array of holes comprises two parallel rows of holes extending between said first and second ends, and said holes in each row have the same diameter and said adjacent holes in said adjacent parallel rows have different diameters from one another.

8. The clip of claim 7, wherein the planer surface extends past the second channel in the same plane as the planar surface.

9. The clip of claim 7, wherein corners of the clip are rounded.

10. The clip of claim 7, wherein the distance between the first channel and the second channel is defined by a distance between adjacent wires forming a cell of a chain link fence.

11. The clip of claim 7, wherein the holes are threaded.

12. A sign clip kit, comprising:

a clip as recited in claim 8, wherein the holes are threaded;

a first threaded fastener sized to mate with a smaller of the at least two holes; and a second threaded fastener sized to mate with a larger of the at least two holes.

13. The sign clip kit of claim 12, further comprising:

a small washer configured for use with the first threaded fastener; and a large washer configured for use with the second threaded fastener.

14. The sign clip kit of claim 12, further comprising:

a second clip as recited in claim 7, wherein the holes are threaded;

a third threaded fastener sized to mate with a smaller of the at least two holes; and a fourth threaded fastener sized to mate with a larger of the at least two holes.

15. The sign clip kit of claim 14, further comprising:

a second small washer configured for use with the third threaded fastener; and a second large washer configured for use with the fourth threaded fastener.

16. The clip of claim 7, wherein in a direction of viewing said front surface with said first end on top and said second end on the bottom, said row on the left has holes of smaller diameter than said row on the right.

* * * * *